(12) United States Patent
Rustad

(10) Patent No.: US 9,479,414 B1
(45) Date of Patent: Oct. 25, 2016

(54) SYSTEM AND METHOD FOR ANALYZING COMPUTING PERFORMANCE

(71) Applicant: Dell Software Inc., Aliso Viejo, CA (US)

(72) Inventor: Joseph Rustad, Toronto (CA)

(73) Assignee: Dell Software Inc., Aliso Viejo, CA (US)

( * ) Notice: Subject to any disclaimer, the term of this patent is extended or adjusted under 35 U.S.C. 154(b) by 337 days.

(21) Appl. No.: 14/292,135

(22) Filed: May 30, 2014

(51) Int. Cl.
*G06F 15/173* (2006.01)
*H04L 12/26* (2006.01)

(52) U.S. Cl.
CPC ............................ *H04L 43/0876* (2013.01)

(58) Field of Classification Search
CPC ................................................. H04L 43/0876
See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,701,137 A | 12/1997 | Kiernan et al. |

(Continued)

FOREIGN PATENT DOCUMENTS

WO   WO-2013162596 A1   10/2013

OTHER PUBLICATIONS

U.S. Appl. No. 13/745,677, Ostermeyer.

(Continued)

*Primary Examiner* — Jonathan Bui
(74) *Attorney, Agent, or Firm* — Winstead PC

(57) ABSTRACT

In one embodiment, a method includes selecting an overall set of end-user transactions. The method further includes selecting an outcome. In addition, the method includes identifying an outcome-filtered subset of the overall set, the outcome-filtered subset comprising end-user transactions of the overall set associated with the selected outcome. The method also includes, for each transaction property of a plurality of transaction properties, measuring a difference between the transaction property's prevalence in the outcome-filtered subset and the transaction property's prevalence in the overall set. The measuring yields a property-prevalence differential for each transaction property. Moreover, the method includes, based, at least in part, on the property-prevalence differentials, determining one or more of the plurality of transaction properties to be correlation factors for the selected outcome.

17 Claims, 5 Drawing Sheets

(56) References Cited

U.S. PATENT DOCUMENTS

| | | | |
|---|---|---|---|
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,148,335 A | 11/2000 | Haggard et al. |
| 6,173,322 B1 | 1/2001 | Hu |
| 6,195,092 B1 | 2/2001 | Dhond et al. |
| 6,199,199 B1 | 3/2001 | Johnston et al. |
| 6,223,171 B1 | 4/2001 | Chaudhuri et al. |
| 6,243,105 B1 | 6/2001 | Hoyer et al. |
| 6,330,008 B1 | 12/2001 | Razdow et al. |
| 6,351,754 B1 | 2/2002 | Bridge, Jr. et al. |
| 6,381,628 B1 | 4/2002 | Hunt |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,833,787 B1 | 12/2004 | Levi |
| 6,847,970 B2 | 1/2005 | Keller et al. |
| 6,901,582 B1 | 5/2005 | Harrison |
| 6,993,454 B1 | 1/2006 | Murstein et al. |
| 7,010,588 B2 | 3/2006 | Martin et al. |
| 7,103,843 B2 | 9/2006 | Hand et al. |
| 7,127,324 B2 | 10/2006 | Batori et al. |
| 7,274,375 B1 | 9/2007 | David |
| 7,363,211 B1 | 4/2008 | Naganathan et al. |
| 7,389,345 B1 | 6/2008 | Adams |
| 7,436,822 B2 | 10/2008 | Lee et al. |
| 7,480,647 B1 | 1/2009 | Murstein et al. |
| 7,480,866 B2 | 1/2009 | Germain et al. |
| 7,483,978 B2 | 1/2009 | Esfahany et al. |
| 7,512,888 B2 | 3/2009 | Sugino et al. |
| 7,523,128 B1 | 4/2009 | Miller et al. |
| 7,532,642 B1 | 5/2009 | Peacock |
| 7,557,803 B2 | 7/2009 | Furukawa et al. |
| 7,558,790 B1 | 7/2009 | Miller et al. |
| 7,565,610 B2 | 7/2009 | Li et al. |
| 7,587,492 B2 | 9/2009 | Dyck et al. |
| 7,620,984 B2 | 11/2009 | Kallahalla et al. |
| 7,644,397 B2 | 1/2010 | Warren et al. |
| 7,685,251 B2 | 3/2010 | Houlihan et al. |
| 7,698,683 B1 | 4/2010 | Miller et al. |
| 7,784,027 B2 | 8/2010 | Harrison |
| 7,792,941 B2 | 9/2010 | Fried et al. |
| 7,822,837 B1 | 10/2010 | Urban et al. |
| 7,882,216 B2 | 2/2011 | Houlihan et al. |
| 7,917,617 B1 | 3/2011 | Ponnapur et al. |
| 7,962,590 B1 | 6/2011 | Or et al. |
| 7,979,245 B1 | 7/2011 | Bourlatchkov et al. |
| 8,051,162 B2 | 11/2011 | Arlitt et al. |
| 8,051,330 B2 | 11/2011 | Cinato et al. |
| 8,051,382 B1 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,161,058 B2 | 4/2012 | Agarwal et al. |
| 8,175,862 B1 | 5/2012 | Bourlatchkov et al. |
| 8,175,863 B1 | 5/2012 | Ostermeyer et al. |
| 8,181,154 B2 | 5/2012 | Harrison |
| 8,185,598 B1 | 5/2012 | Golovin et al. |
| 8,203,972 B2 | 6/2012 | Sauermann |
| 8,217,945 B1 | 7/2012 | Moscovici |
| 8,239,526 B2 | 8/2012 | Simpson et al. |
| 8,255,516 B1 | 8/2012 | Zhang et al. |
| 8,347,273 B2 | 1/2013 | Nageshappa et al. |
| 8,364,460 B2 | 1/2013 | Ostermeyer et al. |
| 8,423,646 B2 | 4/2013 | Jamjoom et al. |
| 8,490,055 B2 | 7/2013 | Basak |
| 8,555,244 B2 | 10/2013 | Harrison |
| 8,635,498 B2 | 1/2014 | Kahana et al. |
| 8,819,673 B1 | 8/2014 | Wilkinson et al. |
| 8,880,678 B1 | 11/2014 | Colton et al. |
| 8,892,415 B2 | 11/2014 | Bourlatchkov et al. |
| 8,930,395 B2 | 1/2015 | Sharma et al. |
| 2001/0018710 A1 | 8/2001 | Clarke et al. |
| 2002/0138659 A1 | 9/2002 | Trabaris et al. |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0084155 A1 | 5/2003 | Graupner et al. |
| 2003/0097438 A1 | 5/2003 | Bearden et al. |
| 2003/0101262 A1 | 5/2003 | Godwin |
| 2003/0126256 A1 | 7/2003 | Cruickshank et al. |
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford et al. |
| 2004/0030592 A1 | 2/2004 | Buck et al. |
| 2004/0039728 A1 | 2/2004 | Fenlon et al. |
| 2004/0046785 A1 | 3/2004 | Keller |
| 2004/0059812 A1 | 3/2004 | Assa |
| 2004/0064293 A1 | 4/2004 | Hamilton et al. |
| 2004/0068560 A1 | 4/2004 | Oulu et al. |
| 2004/0102925 A1 | 5/2004 | Giffords |
| 2005/0021743 A1 | 1/2005 | Fleig et al. |
| 2005/0021748 A1 | 1/2005 | Garcea et al. |
| 2005/0111352 A1 | 5/2005 | Ho et al. |
| 2005/0187750 A1 | 8/2005 | Satoh et al. |
| 2005/0198649 A1 | 9/2005 | Zakonov |
| 2005/0232227 A1 | 10/2005 | Jorgenson et al. |
| 2006/0002478 A1* | 1/2006 | Seo .............. H04L 65/4061 375/240.24 |
| 2006/0101340 A1 | 5/2006 | Sridhar et al. |
| 2006/0168199 A1 | 7/2006 | Chagoly et al. |
| 2006/0171334 A1 | 8/2006 | Hirata et al. |
| 2006/0173875 A1 | 8/2006 | Stefaniak |
| 2007/0008884 A1 | 1/2007 | Tang |
| 2007/0028239 A1 | 2/2007 | Dyck et al. |
| 2007/0043860 A1 | 2/2007 | Pabari |
| 2007/0087756 A1 | 4/2007 | Hoffberg |
| 2007/0226341 A1 | 9/2007 | Mateo |
| 2007/0250525 A1 | 10/2007 | Sanghvi et al. |
| 2007/0255814 A1 | 11/2007 | Green et al. |
| 2008/0016115 A1 | 1/2008 | Bahl et al. |
| 2008/0077366 A1 | 3/2008 | Neuse et al. |
| 2008/0155537 A1 | 6/2008 | Dinda et al. |
| 2008/0162107 A1 | 7/2008 | Aniszczyk et al. |
| 2008/0222633 A1 | 9/2008 | Kami |
| 2008/0263073 A1 | 10/2008 | Ohba et al. |
| 2008/0306711 A1 | 12/2008 | Bansal |
| 2008/0320269 A1 | 12/2008 | Houlihan et al. |
| 2009/0013281 A1 | 1/2009 | Helfman et al. |
| 2009/0083276 A1 | 3/2009 | Barsness et al. |
| 2009/0119301 A1 | 5/2009 | Cherkasova et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 | 7/2009 | McKerlich et al. |
| 2009/0199177 A1 | 8/2009 | Edwards et al. |
| 2009/0204718 A1 | 8/2009 | Lawton et al. |
| 2009/0210527 A1 | 8/2009 | Kawato |

(56) References Cited

U.S. PATENT DOCUMENTS

| | | |
|---|---|---|
| 2009/0222558 A1 | 9/2009 | Xu et al. |
| 2009/0241108 A1 | 9/2009 | Edwards et al. |
| 2009/0271646 A1 | 10/2009 | Talwar et al. |
| 2009/0300605 A1 | 12/2009 | Edwards et al. |
| 2010/0015926 A1* | 1/2010 | Luff .................... H04L 41/0604 455/67.13 |
| 2010/0114554 A1 | 5/2010 | Misra |
| 2010/0125665 A1 | 5/2010 | Simpson et al. |
| 2010/0190509 A1 | 7/2010 | Davis |
| 2010/0223609 A1 | 9/2010 | DeHaan et al. |
| 2010/0229096 A1 | 9/2010 | Maiocco et al. |
| 2010/0241690 A1 | 9/2010 | Kurapati et al. |
| 2010/0315958 A1 | 12/2010 | Luo et al. |
| 2010/0317420 A1 | 12/2010 | Hoffberg |
| 2010/0325273 A1 | 12/2010 | Kudo |
| 2011/0047496 A1 | 2/2011 | Harrison |
| 2011/0066780 A1* | 3/2011 | Bruce ................. G06F 13/4022 710/110 |
| 2011/0119748 A1 | 5/2011 | Edwards et al. |
| 2011/0125800 A1 | 5/2011 | Seager et al. |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0209146 A1 | 8/2011 | Box et al. |
| 2011/0254704 A1 | 10/2011 | Fournier et al. |
| 2011/0270566 A1 | 11/2011 | Sawada et al. |
| 2011/0302577 A1 | 12/2011 | Reuther et al. |
| 2012/0005148 A1 | 1/2012 | Horvitz et al. |
| 2012/0011254 A1 | 1/2012 | Jamjoom et al. |
| 2012/0023429 A1 | 1/2012 | Medhi |
| 2012/0030346 A1 | 2/2012 | Fukuda et al. |
| 2012/0166623 A1 | 6/2012 | Suit |
| 2012/0198073 A1 | 8/2012 | Srikanth et al. |
| 2012/0221314 A1 | 8/2012 | Bourlatchkov et al. |
| 2012/0222002 A1 | 8/2012 | Harrison |
| 2012/0254900 A1 | 10/2012 | Kumar et al. |
| 2012/0271821 A1 | 10/2012 | Qin et al. |
| 2012/0284713 A1 | 11/2012 | Ostermeyer et al. |
| 2013/0066823 A1 | 3/2013 | Sweeney et al. |
| 2013/0159999 A1 | 6/2013 | Chiueh et al. |
| 2013/0174127 A1 | 7/2013 | Chen et al. |
| 2013/0211905 A1 | 8/2013 | Qin et al. |
| 2013/0212285 A1 | 8/2013 | Hoffmann et al. |
| 2013/0218547 A1 | 8/2013 | Ostermeyer et al. |
| 2014/0006580 A1 | 1/2014 | Raghu |
| 2014/0013315 A1 | 1/2014 | Genevski et al. |
| 2014/0052712 A1 | 2/2014 | Savage et al. |
| 2014/0079297 A1 | 3/2014 | Tadayon et al. |
| 2014/0089901 A1 | 3/2014 | Hadar |
| 2014/0092722 A1 | 4/2014 | Jain et al. |
| 2014/0115164 A1 | 4/2014 | Kalyanaraman et al. |
| 2014/0165063 A1 | 6/2014 | Shiva et al. |
| 2014/0269691 A1 | 9/2014 | Xue et al. |
| 2014/0304407 A1 | 10/2014 | Moon |
| 2014/0310813 A1* | 10/2014 | Murthy ............... G06F 11/3644 726/25 |
| 2014/0317261 A1 | 10/2014 | Shatzkamer et al. |
| 2014/0317293 A1 | 10/2014 | Shatzkamer |
| 2014/0350888 A1 | 11/2014 | Gesmann |
| 2014/0372230 A1 | 12/2014 | Ray et al. |
| 2015/0032437 A1 | 1/2015 | Kumar et al. |
| 2015/0046212 A1 | 2/2015 | Mos |
| 2015/0052250 A1 | 2/2015 | Doganata et al. |
| 2015/0127415 A1 | 5/2015 | Showalter et al. |
| 2015/0134589 A1 | 5/2015 | Marrelli et al. |
| 2015/0142457 A1 | 5/2015 | Marshall |
| 2015/0358391 A1 | 12/2015 | Moon et al. |
| 2016/0042296 A1 | 2/2016 | Shan et al. |

OTHER PUBLICATIONS

U.S. Appl. No. 13/658,709, Wang et al.
U.S. Appl. No. 13/658,724, Wang et al.
U.S. Appl. No. 14/725,778, Chen et al.
U.S. Appl. No. 14/607,776, Qin et al.
U.S. Appl. No. 14/607,907, Qin et al.
U.S. Appl. No. 14/858,341, Qin et al.
Template Software, Workflow Template Process Template, "Developing a WFT Workflow System", 1997, whole manual.
Partridge C. et al. FIRE State Message Protocol Specification, BBN Technologies, Jul. 12, 2000, (pp. 1-19).
Newrelicblog, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, Ltd et al.; "Hitachi TPBroker User's Guide: Release 3.1"; Sep. 28, 1998; 311 pages (entire manual).
Laessig, Dirk; "Score Big with JSR 77, the J2EE Management Specification"; Javaworld; Jun. 14, 2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.
Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/greplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
vFoglight Alarms: Overview—Demo 6; 2009; 31 pages.

(56) References Cited

OTHER PUBLICATIONS

Quest Software, Inc.; "Foglight 5.5.8: Managing Dependency Mapping User Guide"; 2011; 53 pages.

Cappelli, Will; "APM Needs Three-Layered Application Materials"; Gartner Research; Feb. 26, 2010; 5 pages.

Microsoft; "What is System Center Advisor?"; http://onlinehelp.microsoft.com/en-us/advisor/ff962512(printer).aspx; accessed on Apr. 5, 2011; 2 pages.

Microsoft; "Microsoft System Center Advisor"; https://www.systemcenteradvisor.com/; accessed on Apr. 4, 2011; 1 page.

Microsoft; "Windows Management Instrumentation (WMI): Frequently Asked Questions: Troubleshooting and Tips"; http://technet.microsoft.com/en-us/library/ee692772(d=printer).aspx; Microsoft TechNet; Jul. 28, 2004; 20 pages.

Maston, Michael; "Managing Windows with WMI"; http://technet.microsoft.com/en-us/library/bb742445(d=printer).aspx; Nov. 1, 1999; 11 pages.

Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.

Solarwinds Worldwide. LLC., "SolarWinds: Virtualization Manager Administrator Guide," DocVersion 6.3.0.1, Sep. 8, 2015, 321 pages.

EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.

EG Innovations, Inc., "Service Overview: VDI Performance Assessment: Move VDI Deployments from Test to Best," www.eginnovations.com, accessed on Sep. 17, 2015, 2 pages.

EG Innovations, Inc., "Total Performance Monitoring for Citrix XenApp and XenDesktop," www.eginnovations.com, accessed on Sep. 17, 2015, 2 pages.

Goliath Technologies, "Goliath Performance Monitor: for Citrix XenApp & XenDesktop," http://goliathtechnologies.com, May 2014, 2 pages.

Goliath Technologies, "Goliath Performance Monitor: for VMware," http://goliathtechnologies.com, May 2014, 2 pages.

VMTurbo, "VDI Control Module," http://vmturbo.com, Nov. 2014, 2 pages.

VMTurbo, "VMTurbo Operations Manager: Demand-Driven Control for Cloud and Virtualization," http://vmturbo.com, Jun. 2015, 2 pages.

U.S. Appl. No. 14/619,897, Diep et al.

U.S. Appl. No. 14/562,474, Rustad et al.

U.S. Appl. No. 14/249,147, Rustad et al.

Quarles, John et al.; "A Mixed Reality Approach for Merging Abstract and Concrete Knowledge"; IEEE Virtual Reality 2008; Mar. 8-12, 2008; pp. 27-34.

Layered Technologies, Inc., "Optimized Application Performance and User Experience: Application Performance Management Service," 2013, 4 pages.

Levey, Tom, "Monitoring the Real End User Experience," www.appdynamics.com, Jul. 25, 2013, 7 pages.

* cited by examiner

FIG. 5

US 9,479,414 B1

SYSTEM AND METHOD FOR ANALYZING COMPUTING PERFORMANCE

BACKGROUND

1. Technical Field

The present disclosure relates generally to data analysis and more particularly, but not by way of limitation, to systems and methods for analyzing computing performance.

2. History of Related Art

Modern web applications process millions of transactions per day and can include multiple redundant layers. When a problem occurs, it can be difficult to trace the problem to a cause. Typical reports and alerts regarding transactions are complex and do not adequately indicate a root cause of poor-performing transactions.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes selecting an overall set of end-user transactions. Each end-user transaction of the overall set is associated with at least one outcome of a plurality of outcomes. The method further includes selecting an outcome from the plurality of outcomes. In addition, the method includes identifying an outcome-filtered subset of the overall set, the outcome-filtered subset comprising end-user transactions of the overall set associated with the selected outcome. The method also includes, for each transaction property of a plurality of transaction properties, measuring a difference between the transaction property's prevalence in the outcome-filtered subset and the transaction property's prevalence in the overall set. The measuring yields a property-prevalence differential for each transaction property. Moreover, the method includes, based, at least in part, on the property-prevalence differentials, determining one or more of the plurality of transaction properties to be correlation factors for the selected outcome.

In one embodiment, an information handling system includes a processing unit, wherein the processing unit is operable to implement a method. The method includes selecting an overall set of end-user transactions. Each end-user transaction of the overall set is associated with at least one outcome of a plurality of outcomes. The method further includes selecting an outcome from the plurality of outcomes. In addition, the method includes identifying an outcome-filtered subset of the overall set, the outcome-filtered subset comprising end-user transactions of the overall set associated with the selected outcome. The method also includes, for each transaction property of a plurality of transaction properties, measuring a difference between the transaction property's prevalence in the outcome-filtered subset and the transaction property's prevalence in the overall set. The measuring yields a property-prevalence differential for each transaction property. Moreover, the method includes, based, at least in part, on the property-prevalence differentials, determining one or more of the plurality of transaction properties to be correlation factors for the selected outcome.

In one embodiment, a computer-program product includes a non-transitory computer-usable medium having computer-readable program code embodied therein. The computer-readable program code is adapted to be executed to implement a method. The method includes selecting an overall set of end-user transactions. Each end-user transaction of the overall set is associated with at least one outcome of a plurality of outcomes. The method further includes selecting an outcome from the plurality of outcomes. In addition, the method includes identifying an outcome-filtered subset of the overall set, the outcome-filtered subset comprising end-user transactions of the overall set associated with the selected outcome. The method also includes, for each transaction property of a plurality of transaction properties, measuring a difference between the transaction property's prevalence in the outcome-filtered subset and the transaction property's prevalence in the overall set. The measuring yields a property-prevalence differential for each transaction property. Moreover, the method includes, based, at least in part, on the property-prevalence differentials, determining one or more of the plurality of transaction properties to be correlation factors for the selected outcome.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 5 illustrates an example of a report.

DETAILED DESCRIPTION OF ILLUSTRATIVE EMBODIMENTS OF THE INVENTION

Figure 1:
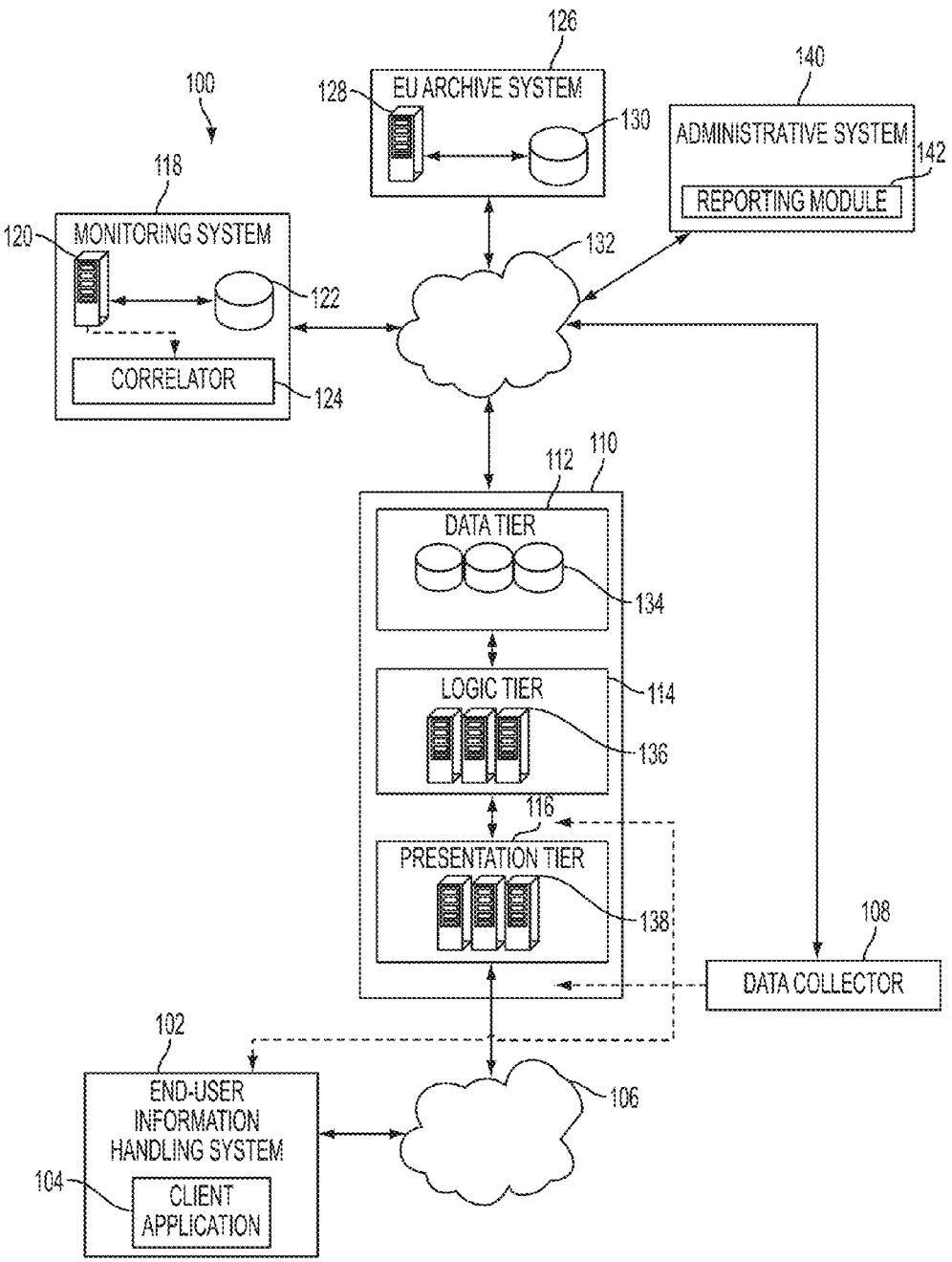
FIG. 1 illustrates a system for generating and performing analysis of end-to-end response times.

In various embodiments, a performance-monitoring system can track and trace end-user (EU) transactions. The performance-monitoring system can produce and store, for example, an end-to-end (E2E) response time for each EU transaction. An EU transaction, as used herein, is initiated by an EU request such as, for example, a web request, includes subsequent processing of the request by a backend-computing system, and is concluded by a web response from the backend-computing system. EU transactions can cross multiple nodes such as, for example, a web browser, a web server, an application server, a database, one or more external services, etc. An E2E response time can include, for example, a time elapsed from initiation through conclusion of an EU transaction.

One way to troubleshoot slow transaction performance is to aggregate E2E response times for a group of EU transactions and examine execution times at each node in an E2E transaction path. An E2E transaction path typically includes a set of nodes through which a given transaction passes. The E2E transaction path can be, for example, application-specific (e.g., web-application-specific). An E2E response time is typically made up of an execution time at each node in the E2E transaction path. For example, consider an exemplary E2E transaction path that includes a web browser, a network, a web server, an application server, and a database. Each E2E response time can be composed of execution times at each of the web browser, the network, the web server, the application server, and the database. For purposes of troubleshooting, execution times for a group of EU transactions can be aggregated, for example, by determining a mean, median, or mode, performing a statistical analysis, etc. From this information, it can be determined where transactions generally spend the most time. Manual root-cause analysis can subsequently occur.

A downside of the above-mentioned approach is that significant performance aberrations may become diluted in the aggregations. For example, it may be that each poor-performing transaction spends an excessively long period of time at the application server. However, until the poor-performing transactions become abundant in number, the aggregate execution times at the application server may not be indicative of a major problem and thus may not be useful in performing a root-cause analysis. In addition, it may not be immediately apparent what constitutes an excessively long execution time or to what degree a given execution time is excessive.

Another way to troubleshoot slow transaction performance is to analyze aggregate statistics such as, for example, error percentages or response times, for transactions that have a particular transaction property. For example, it may be calculated that ninety percent of slow-performing transactions result from New York City web traffic. A downside of this approach is that such aggregate statistics do not adequately account for the prevalence of the particular transaction property being analyzed. For instance, continuing the above example, if ninety percent of EU transactions result from New York City web traffic, it may not be notable that ninety percent of slow-performing transactions result from New York City web traffic. Conversely, if only two percent of EU transactions result from New York City web traffic, the fact that ninety percent of all slow-performing transactions result from New York City web traffic may be much more significant.

Various embodiments described herein can facilitate a comparative performance analysis of transaction properties for a set of EU transactions. In certain embodiments, transaction properties for a set of EU transactions can be aggregated and analyzed. In particular, an overall prevalence of each transaction property can be compared to a prevalence of the transaction property in a subset of EU transactions that are associated with a particular outcome such as, for example, acceptable, unacceptable, error (e.g., indicating that the EU transaction resulted in particular error), and/or the like. Based on this comparison, certain transaction properties can be determined to be correlation factors for the particular outcome.

In general, a transaction property can be any identifiable characteristic of an EU transaction. For a given EU transaction, examples of transaction properties include a particular web browser (e.g., MICROSOFT INTERNET EXPLORER, APPLE SAFARI, GOOGLE CHROME, MOZILLA FIREFOX, etc.), a particular transaction type (e.g., log-in, checkout, etc.), a geographic location (e.g., city, state, province, country, etc.), each method, function, or subroutine called during execution of the EU transaction, each database statement executed, a screen resolution or size, and/or the like. In general, each node of an E2E transaction path can also be a transaction property. It should be appreciated that some transaction characteristics such as a geographic location can include multiple layers of specificity such that each layer is a distinct transaction property. For example, for an EU transaction originating in Atlanta, Ga., Atlanta, Ga., and United States may be distinct transaction properties for the EU transaction. Other examples of transaction properties will be apparent to one skilled in the art after reviewing the present disclosure.

In various embodiments, transaction properties can result from any element of backend-performance data and/or EU-experience data. Backend-performance data, as used herein, refers to data collected during runtime of a software application such as, for example, a web application, through instrumentation of the software application. EU-experience data, as used herein, refers to data collected through observation of one or more transactions from an EU perspective. For example, in various embodiments, the EU perspective may be a node between a web server and an EU information handling system, a node between a web server and an application server, or the EU information handling system.

In general, an outcome of an EU transaction is an assessment of a quality of the EU transaction as measured by performance. For example, in some embodiments, an outcome can indicate whether the EU transaction is an acceptable EU transaction or an unacceptable EU transaction, whether the EU transaction resulted in an error, etc. In other embodiments, an outcome can include other assessments such as good, fair, poor, error, high value, low value, and spam. In certain embodiments, each EU transaction can be associated with either an acceptable category or an unacceptable category based, at least in part, on whether an E2E response time exceeds a configurable threshold. The configurable threshold can be an absolute value (e.g., defined in seconds), a relative value (e.g., defined relative to a mean or median value for a transaction type), and/or the like. The configurable threshold can also be varied by type of transaction (e.g., log-in, checkout, etc.).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates a system 100 for generating and performing analysis of E2E response times. The system 100 includes at least one EU information handling system 102 communicating with a backend-computing system 110 over a network 106. The at least one EU information handling system 102 has a client application 104 such as, for example, a web-browser application, resident and executing thereon. The network 106 may include, for example, a public intranet, a private intranet, and/or the Internet. The system 100 further includes a monitoring system 118, an EU archive system 126, and an administrative system 140. The backend-computing system 110, the monitoring system 118, and the EU archive system 126 are operable to communicate over a network 132. Like the network 106, the network 132 may be representative, for example, of a public or private intranet or the Internet. In addition, the system 100 includes a data collector 108.

For illustrative purposes, the backend-computing system 110 is shown to utilize a three-tier architecture that includes a presentation tier 116, a logic tier 114, and a data tier 112. The presentation tier 116 includes at least one information server 138 such as, for example, a web server, that serves content to be rendered by the client application 104. The logic tier 114 includes at least one application server 136 that operates a platform based on, for example, Java EE, ASP-.NET, PHP, ColdFusion, Perl, and/or the like. The data tier 112 includes at least one database 134 that further includes, for example, data sets and a database management system that manages and provides access to the data sets.

It should be appreciated that, in various embodiments, the backend-computing system 110 may include any number of tiers. In addition, in various embodiments, the backend-computing system 110 may implement various alternative architectures such as, for example, a model-view-controller architecture. It should also be appreciated that the at least one application server 136 and the at least one information server 138 are shown separately in FIG. 1 only for purposes of illustrating logically-related functionality. In various embodiments, the at least one application server 136 and the at least one information server 138 are combined into a single server that functions as web server and application server.

The backend-computing system 110 executes one or more distributed software applications such as, for example, a web application, from which backend-performance data is collected. In a typical embodiment, the one or more distributed software applications have been instrumented to provide the backend-performance data. Each of the one or more distributed software applications may be, for example, a collection of software components or services that make up an application stack. In various embodiments, the backend-computing system 110 may use an agent resident thereon to collect the backend-performance data.

The backend-performance data can include, for example, metrics related to infrastructure components (virtual or physical) such as, for example, the at least one database 134, the at least one application server 136, and the at least one information server 138. The backend-performance data can also include aggregated metrics related to infrastructure tiers such as, for example, the presentation tier 116, the logic tier 114, and the data tier 112. In addition, the backend-performance data can include metrics related to the application stack for each of the one or more distributed software applications. In a typical embodiment, the backend-performance data can trace EU transactions through a topology of nodes that can include, for example, infrastructure components, infrastructure tiers, and/or application-stack components as described above. Metrics can include, for example, execution time at each tier or by each component or node. Examples of how backend-performance data can collected and managed is described in detail in U.S. Pat. No. 7,979,245 and U.S. Pat. No. 8,175,863, each of which is hereby incorporated by reference.

The data collector 108 is a software component that collects the EU-experience data for the at least one EU information handling system 102. In a typical embodiment, the data collector 108 is situated in the system 100 such that the data collector 108 is capable of seeing all network traffic (i.e., all packets exchanged) between the at least one EU information handling system 102 and the backend-computing system 110. In this fashion, the data collector 108 functions as a packet analyzer and is operable to extract the EU-experience data and transmit the EU-experience data to the EU archive system 126. The EU archive system 126 includes at least one server computer 128 and at least one database 130. The EU archive system 126 receives the EU-experience data from the data collector 108 and stores the EU-experience data in the at least one database 130. An example of how EU-experience data can be collected is described in U.S. Pat. No. 7,941,385. U.S. Pat. No. 7,941,385 is hereby incorporated by reference.

As illustrated, the data collector 108 can reside at various nodes in the system 100. For example, the data collector 108 can reside on the backend-computing system 110 between the presentation tier 116 and the logic tier 114. The data collector 108 can also be resident on the backend-computing system 110 between the presentation tier 116 and the network 106. In addition, in various embodiments, the data collector 108 is representative of client-side scripting that is executed on the at least one EU information handling system 102. In this fashion, the data collector 108 can also be resident on the at least one EU information handling system 102. It should be appreciated that other locations for the data collector 108 such as, for example, within the presentation tier 116, are also contemplated.

The monitoring system 118 includes at least one server computer 120 and at least one database 122. The at least one server computer 120 is operable to execute a correlator 124. The correlator 124 is typically a software component that correlates the EU-experience data maintained by the EU archive system 126 with the backend-performance data maintained by the monitoring system 118 to yield E2E response times for EU transactions. Exemplary operation of the system 100 will be described with respect to FIG. 2.

The administrative system 140 includes a reporting module 142. The administrative system 140 can include any number of server computers and/or databases. The reporting module 142 can include hardware and/or software for generating and/or presenting alerts, reports, and/or the like based on data stored or generated by the monitoring system 118 and the EU archive system 126. The reports and/or alerts can be served to an administrative user using, for example, an information handling system similar to the EU information handling system 102. For example, in certain embodiments, the reporting module 142 can facilitate a comparative performance analysis between acceptable EU transactions and unacceptable EU transactions. An example of functionality of the reporting module 142 will be described with respect to FIG. 4.

One of ordinary skill in the art will appreciate that each instance of a computer or computer system as described above may be representative of any number of physical or virtual server computers. Likewise, each instance of a database may be representative of a plurality of databases. In addition, it should be appreciated that, in various embodiments, each instance of a network such as, for example, the network 106 or the network 132, can be viewed as an abstraction of multiple distinct networks. For example, the network 106 and the network 132 can each include one or multiple communications networks such as, for example, public or private intranets, a public switch telephone network (PSTN), a cellular network, the Internet, or the like. In addition, in various embodiments, the network 106 and the network 132 may overlap or refer to a same network.

Figure 2:
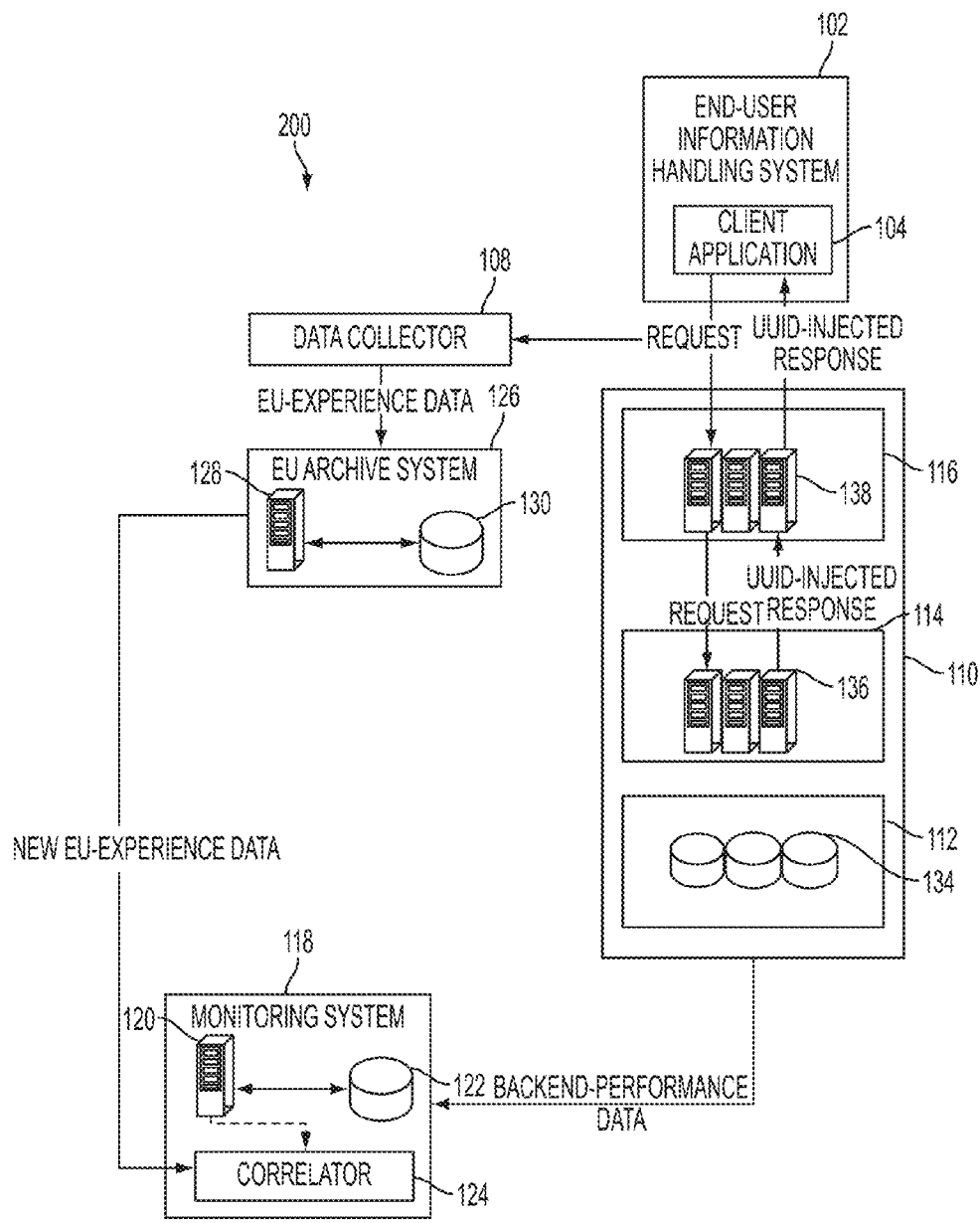
FIG. 2 illustrates an exemplary data flow using the system of FIG. 1.

FIG. 2 illustrates an exemplary data flow 200 using the system 100 of FIG. 1. The EU information handling system 102 initiates a transaction by directing a request such as, for example, an HTTP request, to the at least one information server 138 of the presentation tier 116. The at least information server 138 forwards the request to an appropriate application server, i.e., the at least one application server 136, for handling. The at least one application server 136 generates an identifier (e.g., a UUID) for the transaction. In a typical embodiment, the backend-computing system 110 uses the identifier to identify backend-performance data collected during processing of the transaction, which data is stored by the monitoring system 118 as described above.

A monitoring agent on the at least one application server 136 injects the identifier in a response to the request (i.e., a UUID-injected response), which response is directed to the at least one EU information handling system 102 along a transmission path that includes that at least one information server 138 and the at least one EU information handling system 102. In this fashion, no modification of application code is required to inject the identifier. Rather, the monitoring agent, which is already being utilized for existing instrumentation of the distributed software application, injects the identifier into the response. The response may be a web response such as, for example, an HTTP response. In various embodiments, the identifier can be injected, for example, into a response header for the response. In some embodiments, the identifier may be inserted into a cookie that is sent as part of the response header. Content of the UUID-injected response is rendered on the at least one EU information handling system 102 via the client application 104.

As noted above, the data collector 108 is situated on the system 100 so that the data collector 108 can observe all network traffic exchanged between the backend-computing system 110 and the EU information handling system 102. Therefore, the data collector 108 is effectively a transparent node along the transmission path. The data collector 108 passively observes the UUID-injected response and uses the identifier to identify EU-experience data that is collected.

The correlator 124 is operable to extract EU-experience data not previously obtained by the correlator (i.e., new EU-experience data) from the EU archive system 126. In various embodiments, the correlator 124 may operate on a periodic basis, on-demand, or in real-time. The correlator 124 is operable to correlate the EU-experience data and the backend-performance data that relates to a same transaction (i.e., a same request and response) by cross-referencing identifiers. In this manner, data resulting from instrumentation (the backend-performance data) and the EU-experience data, which is typically collected without instrumentation, can be correlated. The correlated data can be stored in the at least one database 122. The correlated data can also be used to generate E2E response times for end-use transactions. In addition, on a periodic basis (e.g., every five minutes) or on demand, the correlator 124 may aggregate the correlated data into one or more high-level transaction categories such as, for example, log-in, search, or checkout. Therefore, problems with particular transaction categories can be readily identified and appropriate alerts generated.

Figure 3:
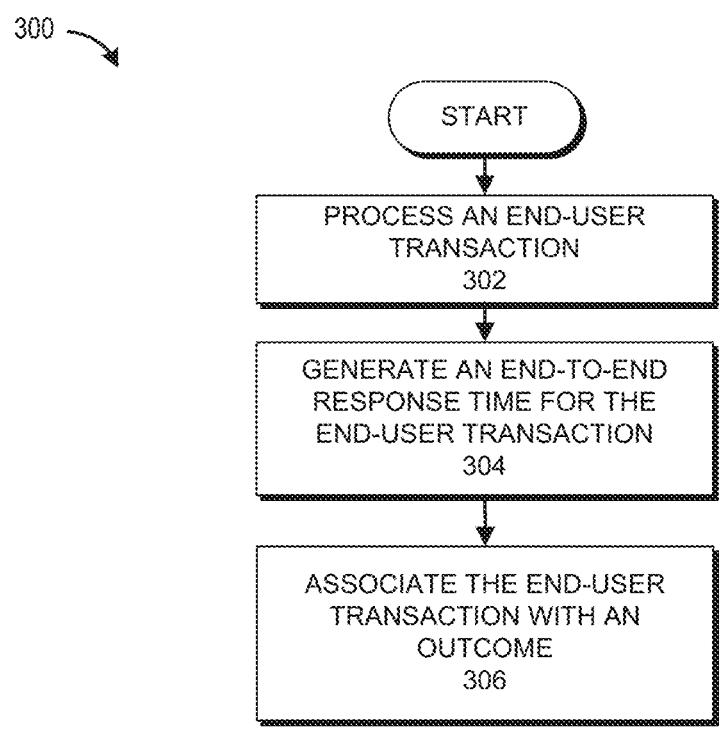
FIG. 3 illustrates an example of a process for determining an acceptability categorization of an end-user transaction.

FIG. 3 illustrates an example of a process 300 for determining an acceptability categorization of an EU transaction. In various embodiments, the process 300 can be performed for each EU transaction handled by a backend-computing system such as the backend-computing system 110. For example, the process 300, in whole or in part, can be implemented by one or more of the monitoring system 118, the correlator 124, the EU archive system 126, the administrative system 140, the reporting module 142, and/or the EU information handling system 102. The process 300 can also be performed generally by the system 100. Although any number of systems, in whole or in part, can implement the process 300, to simplify discussion, the process 300 will be described in relation to specific systems or subsystems of the system 100.

At block 302, the system 100 processes an EU transaction. For example, the block 302 can include tracing the EU transaction as described with respect to FIGS. 1 and 2. At block 304, the monitoring system 118, or another component, generates an E2E response time for the EU transaction. For example, the E2E response time can be based on correlated data as described with respect to FIGS. 1-2. The E2E response time can also be based on backend-performance data and EU-experience data that is correlated in other ways such as, for example, session identifiers, session timing, and/or other information.

At block 306, the monitoring system 118, the reporting module 142, or another component, associates the EU transaction with an outcome. For purposes of this illustration, the outcome is either an acceptable category or an unacceptable category. For example, in certain embodiments, the EU transaction can be associated with the unacceptable category if the E2E response time exceeds a configurable threshold value. Otherwise, the EU transaction can be associated with the acceptable category. The configurable threshold can be an absolute value (e.g., defined in seconds), a relative value (e.g., defined relative to a mean or median value for a transaction type), and/or the like. The configurable threshold can also be varied by type of transaction (e.g., log-in, checkout, etc.). The association can also be stored, for example, in the at least one database 122, a database on the administrative system 140, in memory of the monitoring system 118 and/or the administrative system 140, etc.

Figure 4:
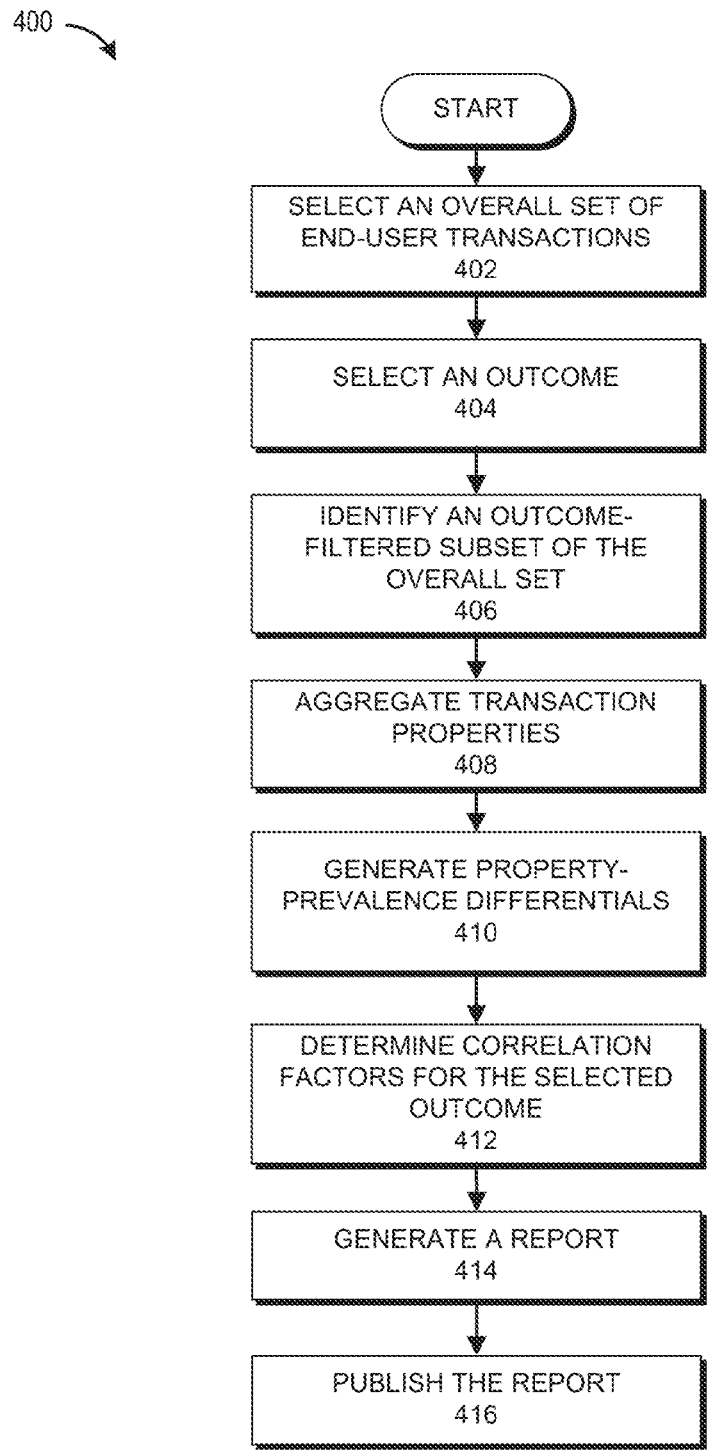
FIG. 4 illustrates an example of a process for correlating transaction properties to a particular outcome.

FIG. 4 illustrates an example of a process 400 for correlating transaction properties to a particular outcome. For example, the process 400, in whole or in part, can be implemented by one or more of the monitoring system 118, the correlator 124, the EU archive system 126, the administrative system 140, the reporting module 142, and/or the EU information handling system 102. The process 400 can also be performed generally by the system 100. Although any number of systems, in whole or in part, can implement the process 400, to simplify discussion, the process 400 will be described in relation to specific systems or subsystems of the system 100.

At block 402, the reporting module 142 selects an overall set of EU transactions. In various embodiments, the overall set of EU transactions can be any grouping of EU transactions, systematic or arbitrary. In some cases, the overall set of EU transactions can relate to a same application or web application. Each EU transaction of the overall set may be of a same type or a different type. In an example, the overall set can include all checkout transactions over a certain period of time. In another example, the overall set can include a heterogeneous set of transaction types such as, for example, log-in, search, and checkout. In certain embodiments, the overall set can include EU transactions for which a process similar to the process 300 of FIG. 3 has been executed. In some embodiments, the selection of the overall set can be automated. In other embodiments, the selection can be responsive to user input, for example, from an administrative user of an information handling system such as the EU information handling system 102.

At block 404, the reporting module 142 selects an outcome from among a plurality of potential outcomes. For example, in some embodiments, the plurality of potential outcomes can include the acceptable and unacceptable categorizations described with respect to FIG. 3. In some embodiments, the selection of the outcome can be automated. In other embodiments, the outcome can be pre-specified or hardcoded. In still other embodiments, the selection can be responsive to user input, for example, from an administrative user of an information handling system such as the EU information handling system 102.

At block 406, the reporting module 142 identifies an outcome-filtered subset of the overall set. In a typical embodiment, the outcome-filtered subset includes those EU transactions of the overall set that are associated with the selected outcome. In an example, a given EU transaction may be associated with the selected outcome as a result of a process similar to the process 300 of FIG. 3. According to this example, each EU transaction of the overall set may be associated with the acceptable category, the unacceptable category, one or more errors, etc.

At block 408, the reporting module 142 aggregates transaction properties. In some embodiments, the reporting module 142 may aggregate transaction properties of all transactions in the overall set. In other embodiments, the reporting module 142 may aggregate transaction properties of transactions in the outcome-filtered subset. Transaction properties can also be aggregated in other fashions such as, for example, through manual specification, access of a pre-specified set of transaction properties, etc.

At block 410, the reporting module 142 generates a property-prevalence differential for each of the aggregated transaction properties. In a typical embodiment, the block 410 involves measuring a difference between a particular transaction property's prevalence in the outcome-filtered subset and the particular transaction property's prevalence in the overall set. The property-prevalence differential can be indicative of the difference. Consider, for example, a transaction property of city. If ninety percent of transactions in the outcome-filtered subset have the transaction property of New York City but only ten percent of transactions in the overall set have set the transaction property of New York City, the property-prevalence differential could be eighty-five percent. It should be appreciated that, in various embodiments, the property-prevalence differentials can represent values that are weighted or otherwise manipulated. In some embodiments, the property-prevalence differential can be an absolute value so as to exclude negative values.

At block 412, the reporting module 142 determines one or more correlation factors for the selected outcome. The one or more correlation factors can be determined from among the aggregated transaction properties. According to the examples described above, a higher property-prevalence differential is generally indicative of a higher correlation with the selected outcome. In some embodiments, a specified number of top transaction properties can be determined to be the one or more correlation factors. The specified number can be automatically selected, input by an administrator or other use, etc. In other embodiments, transaction properties that meet certain criteria can be determined to be the one or more correlation factors. The certain criteria can specify a constraint such as, for example, a minimum property-prevalence differential. The one or more correlation factors can also be determined using a combination of the foregoing and/or in another fashion.

At block 414, the reporting module 142 generates a report of the one or more correlation factors. The report can include the correlation factors, corresponding property-prevalence differentials, and/or other information.

At block 416, the reporting module 142 publishes the report. For example, the report can be transmitted to a system, entity, or user. In some embodiments, the block 416 can include causing the report to be displayed, for example, to an administrative of user of an EU information handling system such as the EU information handling system 102 of FIG. 1. In some embodiments, publishing the report can include transmitting the report to another system for analysis. For example, in some cases, the report can be used to make automatic scaling decisions in a shared-resource environment such as, for example, a cloud environment.

FIG. 5 illustrates an example of a report 500. In various embodiments, the report 500 can be generated as described with respect to the block 414 of FIG. 4 and/or caused to be displayed as described with respect to the block 416 of FIG. 4. As illustrated, the report 500 shows top correlation factors for an outcome of "poor performance," which assessment can correspond to the unacceptable categorization described above, and an outcome of "errors." For each outcome, a list of top correlation factors is shown along with a corresponding property-prevalence differential. In a typical embodiment, the top correlation factors and the property-prevalence differentials of FIG. 5 can result from a process such as, for example, the process 400 of FIG. 4.

Advantageously, in certain embodiments, a report such as the report 500 enables identification and comparison of transaction properties of heterogeneous types. A root cause of a particular outcome can thereby more easily be identified. For example, in the illustration of FIG. 5, the correlation factors include transaction properties related to geographic location, transaction type, and browser, among others. The transaction properties can include properties extracted from backend-performance data, EU-experience data, and/or other data. A process such as the process 400 of FIG. 4 described above can enable cross-comparison of such heterogeneous transaction properties and identification of which transaction properties are most correlative with a particular outcome.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system comprising physical computer hardware:
   selecting an overall set of end-user transactions;
   wherein each end-user transaction of the overall set is associated with at least one outcome of a plurality of outcomes;
   selecting an outcome from the plurality of outcomes;
   identifying an outcome-filtered subset of the overall set, the outcome-filtered subset comprising end-user transactions of the overall set associated with the selected outcome;
   for each transaction property of a plurality of transaction properties, measuring a difference between the transaction property's prevalence in the outcome-filtered subset and the transaction property's prevalence in the overall set, the measuring yielding a property-prevalence differential for each transaction property;
   based, at least in part, on the property-prevalence differentials, determining one or more of the plurality of transaction properties to be correlation factors for the selected outcome;
   generating a report comprising information related to the correlation factors; and
   publishing the report.

2. The method of claim 1, wherein the selecting of the overall set is performed responsive to input received from a user.

3. The method of claim 1, wherein the selecting of the outcome is performed responsive to input received from a user.

4. The method of claim 1, further comprising:
   prior to the measuring, aggregating transaction properties of at least one of the overall set and the outcome-filtered subset; and
   wherein the plurality of transaction properties comprise the aggregated transaction properties.

5. The method of claim 1, wherein the plurality of transaction properties comprise one or more transaction properties extracted from backend-performance data and one or more transaction properties extracted from end-user experience data.

6. The method of claim 1, wherein the plurality of transaction properties are selected from the group consisting of: an executed method, an executed database statement, a screen resolution, a node of an end-to-end transaction path, and a geographic location.

7. An information handling system comprising:
   a computer processor, wherein the computer processor is operable to implement a method, the method comprising:
      selecting an overall set of end-user transactions;
      wherein each end-user transaction of the overall set is associated with at least one outcome of a plurality of outcomes;
      selecting an outcome from the plurality of outcomes;
      identifying an outcome-filtered subset of the overall set, the outcome-filtered subset comprising end-user transactions of the overall set associated with the selected outcome;
      for each transaction property of a plurality of transaction properties, measuring a difference between the transaction property's prevalence in the outcome-filtered subset and the transaction property's prevalence in the overall set, the measuring yielding a property-prevalence differential for each transaction property;
      based, at least in part, on the property-prevalence differentials, determining one or more of the plurality of transaction properties to be correlation factors for the selected outcome;
      generating a report comprising information related to the correlation factors; and
      publishing the report.

8. The information handling system of claim 7, wherein the selecting of the overall set is performed responsive to input received from a user.

9. The information handling system of claim 7, wherein the selecting of the outcome is performed responsive to input received from a user.

10. The information handling system of claim 7, the method further comprising:
    prior to the measuring, aggregating transaction properties of at least one of the overall set and the outcome-filtered subset; and
    wherein the plurality of transaction properties comprise the aggregated transaction properties.

11. The information handling system of claim 7, wherein the plurality of transaction properties comprise one or more transaction properties extracted from backend-performance data and one or more transaction properties extracted from end-user experience data.

12. The information handling system of claim 7, wherein the plurality of transaction properties are selected from the group consisting of: an executed method, an executed database statement, a screen resolution, a node of an end-to-end transaction path, and a geographic location.

13. A computer-program product comprising a non-transitory computer-usable medium having computer-readable program code embodied therein, the computer-readable program code adapted to be executed to implement a method comprising:
    selecting an overall set of end-user transactions;
    wherein each end-user transaction of the overall set is associated with at least one outcome of a plurality of outcomes;
    selecting an outcome from the plurality of outcomes;
    identifying an outcome-filtered subset of the overall set, the outcome-filtered subset comprising end-user transactions of the overall set associated with the selected outcome;
    for each transaction property of a plurality of transaction properties, measuring a difference between the transaction property's prevalence in the outcome-filtered subset and the transaction property's prevalence in the overall set, the measuring yielding a property-prevalence differential for each transaction property;
    based, at least in part, on the property-prevalence differentials, determining one or more of the plurality of transaction properties to be correlation factors for the selected outcome;
    generating a report comprising information related to the correlation factors; and
    publishing the report.

14. The computer-program product of claim 13, wherein the selecting of the overall set is performed responsive to input received from a user.

15. The computer-program product of claim 13, the method further comprising:
    prior to the measuring, aggregating transaction properties of at least one of the overall set and the outcome-filtered subset; and
    wherein the plurality of transaction properties comprise the aggregated transaction properties.

16. The computer-program product of claim 13, wherein the plurality of transaction properties comprise one or more transaction properties extracted from backend-performance data and one or more transaction properties extracted from end-user experience data.

17. The computer-program product of claim 13, wherein the plurality of transaction properties are selected from the group consisting of: an executed method, an executed database statement, a screen resolution, a node of an end-to-end transaction path, and a geographic location.

* * * * *